US012091023B2

(12) United States Patent
Kawasaki

(10) Patent No.: US 12,091,023 B2
(45) Date of Patent: Sep. 17, 2024

(54) INFORMATION PROCESSING SYSTEM, INFORMATION PROCESSING METHOD, COMPUTER PROGRAM PRODUCT, AND VEHICLE CONTROL SYSTEM

(71) Applicant: KABUSHIKI KAISHA TOSHIBA, Tokyo (JP)

(72) Inventor: Atsushi Kawasaki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 859 days.

(21) Appl. No.: 17/184,661

(22) Filed: Feb. 25, 2021

(65) Prior Publication Data

US 2022/0057992 A1 Feb. 24, 2022

(30) Foreign Application Priority Data

Aug. 20, 2020 (JP) ................. 2020-139082

(51) Int. Cl.
*B60W 50/00* (2006.01)
*B60W 30/09* (2012.01)
(Continued)

(52) U.S. Cl.
CPC ........ *B60W 50/0097* (2013.01); *B60W 30/09* (2013.01); *B60W 30/0956* (2013.01); *G06F 7/523* (2013.01); *G06F 17/18* (2013.01)

(58) Field of Classification Search
CPC ............ B60W 50/0097; B60W 30/09; B60W 30/0956; B60W 50/0098;
(Continued)

(56) References Cited

U.S. PATENT DOCUMENTS

2020/0049511 A1* 2/2020 Sithiravel ............. B60W 10/18
2022/0108544 A1* 4/2022 Becker ..................... G06T 7/73

FOREIGN PATENT DOCUMENTS

DE 102013208521 A1 * 11/2014 ............. G01C 21/32
JP 2018-055141 A 4/2018
JP 2019-159535 A 9/2019

OTHER PUBLICATIONS

Machine translation of DE-102013208521-A1. (Year: 2014).*
(Continued)

*Primary Examiner* — Navid Z. Mehdizadeh
*Assistant Examiner* — Caitlin R McCleary
(74) *Attorney, Agent, or Firm* — Oblon, McClelland, Maier & Neustadt, L.L.P.

(57) ABSTRACT

An information processing system according to an embodiment includes one or more hardware processors. The hardware processors acquire an n-dimensional vector. The hardware processors generate n coordinate arrays, where the n coordinate arrays is n pieces of n-dimensional arrays for which, with respect to each of elements of an m-th array ($1 \leq m \leq n$), an element value having a same value as an index of an m-th dimensional coordinate of the elements is set. The hardware processors obtain n first probability distribution arrays including an output value of a probability density function as an element value corresponding to each of the n coordinate arrays, multiply n element values for each of elements corresponding to each of the n first probability distribution arrays, and obtain a second probability distribution array having a result of multiplication as an element value.

12 Claims, 13 Drawing Sheets

(51) Int. Cl.
  *B60W 30/095* (2012.01)
  *G06F 7/523* (2006.01)
  *G06F 17/18* (2006.01)

(58) Field of Classification Search
  CPC ..... B60W 2050/0028; B60W 60/00274; G06F 7/253; G06F 17/18; G06N 3/044; G06N 3/045; G06N 7/01; G06V 10/82; G06V 20/52
  See application file for complete search history.

(56) References Cited

OTHER PUBLICATIONS

Kim, "Probabilistic vehicle trajectory prediction over occupancy grid map via recurrent neural network", IEEE, 2017, pp. 399-404 (Year: 2017).*
Cui et al., "Multimodal trajectory predictions for autonomous driving using deep convolutional networks", International Conference on Robotics and Automation (ICRA), IEEE, 2019, 7 pages.
Liu et al., "An intriguing failing of convolutional neural networks and the CoordConv solution", NeurIPS, 2018, 26 pages (with Supplementary Information).
Zhao et al., "Multi-Agent Tensor Fusion for Contextual Trajectory Prediction", CVPR, 2019, 9 pages.

* cited by examiner

| 0 | 1 | 2 | 3 | 4 | 5 | 6 |
|---|---|---|---|---|---|---|
| 0 | 1 | 2 | 3 | 4 | 5 | 6 |
| 0 | 1 | 2 | 3 | 4 | 5 | 6 |
| 0 | 1 | 2 | 3 | 4 | 5 | 6 |
| 0 | 1 | 2 | 3 | 4 | 5 | 6 |
| 0 | 1 | 2 | 3 | 4 | 5 | 6 |
| 0 | 1 | 2 | 3 | 4 | 5 | 6 |

211

| 0 | 0 | 0 | 0 | 0 | 0 | 0 |
|---|---|---|---|---|---|---|
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |
| 6 | 6 | 6 | 6 | 6 | 6 | 6 |

212

INFORMATION PROCESSING SYSTEM, INFORMATION PROCESSING METHOD, COMPUTER PROGRAM PRODUCT, AND VEHICLE CONTROL SYSTEM

CROSS-REFERENCE TO RELATED APPLICATIONS

This application is based upon and claims the benefit of priority from Japanese Patent Application No. 2020-139082, filed on Aug. 20, 2020; the entire contents of which are incorporated herein by reference.

FIELD

Embodiments described herein generally relate to an information processing system, an information processing method, a computer program product, and a vehicle control system.

BACKGROUND

In order to realize safe and comfortable autonomous driving and driving support of automobiles and autonomous movement of robots, there is a need to grasp not only stationary obstacles such as buildings, fences, and curbs, but also the movements of moving objects such as other vehicles and pedestrians beforehand. In scenes such as changing lanes and crossing intersections in particular, unless predicting how moving objects will move in the future, the safe behavior of an own vehicle is not determinable.

Prediction techniques regarding prediction of future positions of moving objects existing in the surroundings have been actively considered, and there are many methods using neural networks. For example, there is a proposed technique of extracting features from map (image) information by using Convolutional Neural Networks (CNNs) and combining extracted features with features of trajectory position information (vector) so as to be used for prediction.

However, by the conventional techniques, there are cases where data is not represented in an appropriate format, resulting in that processing using this data cannot be appropriately executed. For example, the technique of combining a feature (map feature) extracted from map information and the vector feature as described above has dimensional inconsistency between a plurality of features, and thus, the map feature is transformed to be compatible with the vector. However, there are cases where the transformation would impair spatial features of the map features, resulting in that high-precision prediction processing in a subsequent stage cannot be executed.

DETAILED DESCRIPTION

Figures 1, 2:
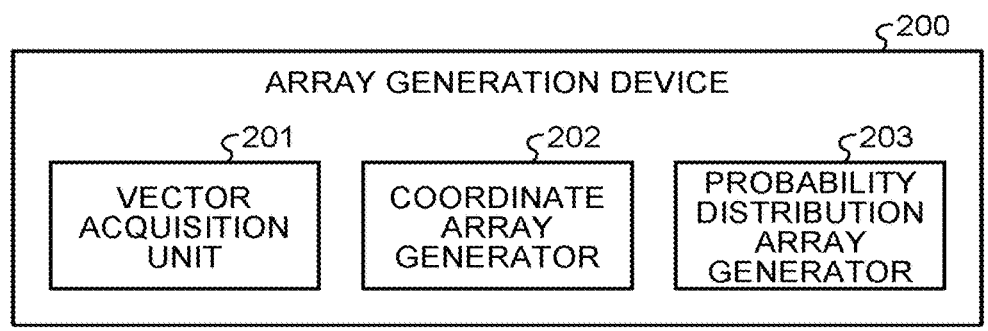
FIG. 1 is a block diagram of an information processing system according to a first embodiment.
FIG. 2 is a diagram illustrating an example of setting a coordinate array.

An information processing system according to an embodiment includes one or more hardware processors. The hardware processors acquire an n-dimensional vector. The hardware processors generate n coordinate arrays, where the n coordinate arrays is n pieces of n-dimensional arrays for which, with respect to each of elements of an m-th array ($1 \leq m \leq n$), an element value having a same value as an index of an m-th dimensional coordinate of the elements is set. The hardware processors obtain n first probability distribution arrays including an output value of a probability density function as an element value corresponding to each of the n coordinate arrays, multiply n element values for each of elements corresponding to each of the n first probability distribution arrays, and obtain a second probability distribution array having a result of multiplication as an element value.

Hereinafter, preferred embodiments of an information processing system, an information processing method, a computer program product, and a vehicle control system according to the present invention will be described in detail with reference to the accompanying drawings.

First Embodiment

In order to make a prediction with higher stability, there has been proposed a method of making a prediction using a high-precision map and an aerial photographic image including information such as a lane center line as environmental information. However, such map information needs to be prepared in advance, and preparing the map information for all roads would not be practical. In addition, generating a high-precision map would need a large processing load and cost.

In view of this, there has been a demand for a technique capable of predicting the position of other moving objects existing in the surroundings by using information obtained from sensors such as cameras and laser sensors attached to moving objects (automobiles, autonomous mobile robots, or the like) alone without using map information prepared in advance. There are a large number of proposed technologies for transforming information from devices such as cameras and laser sensors into top views. Unfortunately, however, such a top view does not include information such as the lane center line, and thus, it is necessary to extract features more properly in order to perform learning with a neural network.

The technique of transforming map features might impair spatial features as described above, and thus is not suitable when it is desired to extract features more properly.

To handle this, the present embodiment uses a technique of transforming a vector representing a trajectory into an array format that can be projected onto a map (image). This makes it possible to integrate the information with a vector without impairing the spatial features of the map (image) so as to be used for a prediction process or the like.

When transformation parameters that transforms the trajectory coordinate system to the map coordinate system are known, it would be possible to project a vector representing the trajectory onto a map. However, in the transformation using transformation parameters alone, the coordinate values after the transformation can be the decimals. Therefore, in order to indicate the positions on the map, it is necessary to further convert the transformed coordinate values to integers (indexes). Such a process is a non-differentiable process and thus cannot be incorporated into a neural network, for example.

Another possible method would be using a neural network to project a vector representing a trajectory or the like onto an image. However, the use of a neural network involves internal processing being a black box, and thus, there are cases where it is difficult to ensure the execution of the projection process with high accuracy.

In view of this, the present embodiment uses a process that is differentiable and that can ensure at least a part of internal processing and transforms a vector representing a trajectory into an array format that can be projected onto an image.

In the following, a case of transforming a vector representing the trajectory of a moving object into a format that can be projected onto a map (image) will be described as an example. For example, the vector representing a trajectory is a two-dimensional vector. A map can be considered as a two-dimensional array. Applicable information is not limited to these. This is also applicable to the process of transforming an n-dimensional vector (n is an integer of 2 or more) into an n-dimensional array.

The generated array may be used as it is in a subsequent process, or may be integrated with information having the same dimension and then used in the subsequent process. Examples of the subsequent processes include but are not limited to a trajectory prediction process using a neural network. The subsequent process may be another process using a neural network, or may be a process other than the neural network capable of incorporating a differentiable process.

FIG. 1 is a block diagram illustrating an example of a functional configuration of an array generation unit 200 as the information processing system according to the first embodiment. The array generation unit 200 includes a vector acquisition unit 201, a coordinate array generation unit 202, and a probability distribution array generation unit 203.

The vector acquisition unit 201 acquires an n-dimensional vector (multidimensional vector). Each of element values of the multidimensional vector may be an integer or a numerical value of the decimals.

Using the multidimensional vector as an input, the coordinate array generation unit 202 generates the same number (n) of coordinate arrays as the multidimensional vector. The coordinate array is an array with the same number of dimensions (n dimensions) as the multidimensional vector. For example, when the multidimensional vector is a two-dimensional vector (such as a vector representing a position in two-dimensional space), the coordinate array stores element values for each of coordinates represented in two dimensions (for example, x-coordinate and y-coordinate). The size of each of dimensions of the coordinate array is predetermined.

The element values of the n coordinate arrays are set as follows.

Each of elements of the m-th (1≤m≤n) coordinate array is set with an element value of the same value as an index of the m-th dimension coordinate.

The indexes are 0, 1, 2, . . . , Sm−1. Sm is the size of the coordinates in the m-th dimension.

FIG. 2 is a diagram illustrating an example of setting a coordinate array when n=2. FIG. 2 is an example in which the upper left is the origin, the right direction is the x coordinate, and the lower direction is the y coordinate. Both coordinates have a size of 7, which means S1=S2=7.

Each of elements of a first coordinate array 211 is set with an element value having the same value as the index of the x coordinate (coordinate of the first dimension) of the element. As a result, the same element values are set in the y-coordinate direction. Each of elements of a second coordinate array 212 is set with an element value having the same value as the index of the y coordinate (coordinate of the two dimension) of the element. As a result, the same element values are set in the x-coordinate direction. The similar applies to the cases where n is 3 or more. For example, in a case where an element value with the same value as the index is set in the direction of the first dimension coordinates (x coordinate, or the like), the same value is set in the direction of other coordinates.

Figure 3:
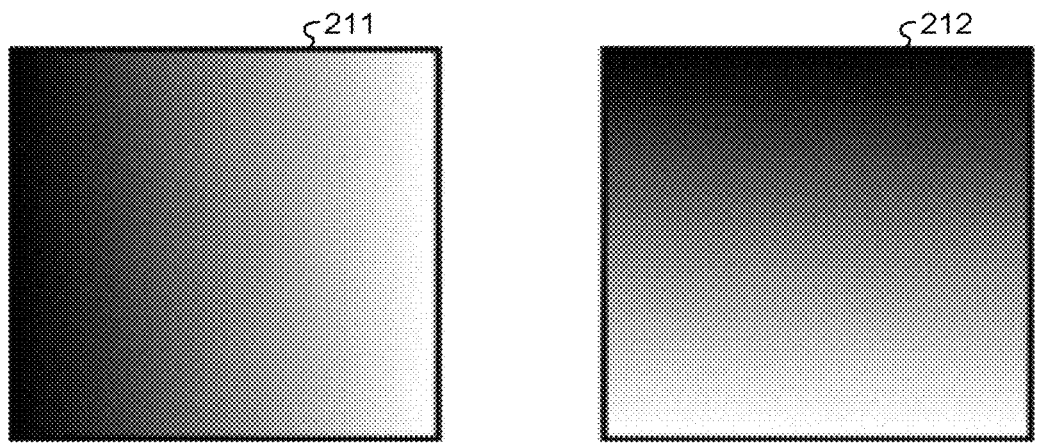
FIG. 3 is a diagram illustrating an example of a coordinate array represented in an image format.

FIG. 3 is a diagram illustrating an example in which the coordinate array is represented in the form of an image. The image of FIG. 3 corresponds to a two-dimensional image having the element value being a pixel value. The image corresponding to the coordinate array 211 is a gradation image in which the pixel value gradually changes in the x-coordinate direction. The image corresponding to the coordinate array 212 is a gradation image in which the pixel value gradually changes in the y-coordinate direction.

Returning to FIG. 1, using the multidimensional vector and using the plurality of coordinate arrays generated by the coordinate array generation unit 202 as inputs, the probability distribution array generation unit 203 generates a multidimensional array in which positions indicated by the coordinates of the multidimensional vector are expressed in the form of probability distribution. The multidimensional array expressed in the form of probability distribution is hereinafter referred to as a probability distribution array. The number of dimensions of the probability distribution array is n, which is the same as the multidimensional vector and coordinate array.

First, the probability distribution array generation unit 203 calculates a difference between an 1-th (1≤l≤n) dimensional value of the multidimensional vector and each of the element values of the coordinate array for each of the 1-th coordinate arrays included in the n coordinate arrays. The probability distribution array generation unit 203 inputs the calculated difference as an input value to a probability density function (PDF), and generates a probability distribution array (first probability distribution array) defining an output value output by the probability density function as an element value of the corresponding element. The probability density function is a function, such as a Gaussian distribution, which maximizes an output value (probability) when the input value is 0. In this example, the input value input to the probability density function corresponds to the value obtained from the multidimensional vector and the element value of the coordinate array (difference between the two).

Next, the probability distribution array generation unit 203 multiplies the corresponding n element values of each of the generated n probability distribution arrays (first probability distribution array) for each of elements, and uses the multiplication result as the element value to generate a probability distribution array (second probability distribution array).

Figure 4:
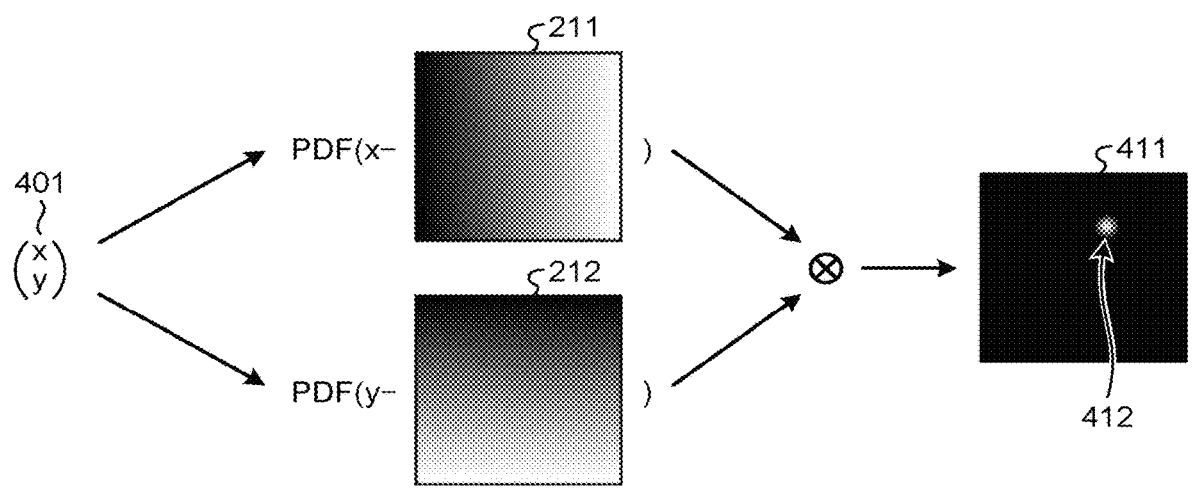
FIG. 4 is a diagram illustrating a specific example of a probability distribution array generation process.

FIG. 4 is a diagram illustrating a specific example of a probability distribution array generation process. FIG. 4 illustrates an example of generating a probability distribution array when n=2. A vector 401 is a two-dimensional vector to be input. Processing using the probability density function (PDF) is performed for each of dimensions.

Regarding the x-coordinate, the probability distribution array generation unit 203 calculates a difference between the x-coordinate value of the vector 401 and each of elements of the coordinate array 211. Next, the probability distribution array generation unit 203 inputs the difference calculated for each of elements into the probability density function (PDF) to calculate an output value (probability). The calculated output value is set as an element value of the corresponding element.

As described above, the probability density function is a function that maximizes the probability when the input value is 0. Accordingly, the closer the index value of the x-coordinate of the array is to the x-coordinate value of the vector 401, the larger the element value (probability) of the array of the index.

The probability distribution array generation unit 203 executes the similar process for the y coordinate. The probability distribution array generation unit 203 generates a probability distribution array (second probability distribution array) 411 defining a value obtained by multiplying the element value of each of elements of the probability distribution array obtained for the x coordinate and the element value of each of the elements of the probability distribution array obtained for the y coordinate, as an element value of the corresponding element.

In the probability distribution array 411, the closer the index to the x-coordinate and y-coordinate values of the vector 401, the greater the element value. An element value 412 indicates an element value corresponding to an index close to the coordinates indicated by the vector 401. In this manner, the probability distribution array 411 can be considered as an array in which element values that draw attention to the position indicated by the vector 401 are set.

The similar applies to the case where n is 3 or more. In this case, the probability distribution array generation unit 203 executes a process using a probability density function for each of coordinates of a multidimensional array, and the element values of a plurality of probability distribution arrays obtained for each of coordinates are multiplied for each of elements (execution of multiplication), enabling the probability distribution array generation unit 203 to generate a multidimensional probability distribution array.

The probability density function does not have to be the function that maximizes the probability when the input value is 0. The probability distribution array generation unit 203 may use a probability density function that applies a value of the vector 401 as a mean. For example, the probability distribution array generation unit 203 uses a probability density function that applies, as a mean, the values of the coordinates of the same dimension (1-th dimension) of the multidimensional vector for the coordinates of the 1-th dimension. When such a probability density function is used, there is no need to perform the process of calculating the difference between the value of the multidimensional vector and the element value of the coordinate array.

In this example, the input value input to the probability density function is the element value of the coordinate array. Furthermore, the probability density function can be considered as a probability density function determined in accordance with a multidimensional vector.

The variance of the probability density function may be a fixed value or may be obtained based on parameters learned using a model such as a neural network. Even when this parameter is introduced, the peak position of the output probability distribution array would not change. Therefore, for example, not all processes for generating a probability distribution array would be a black box.

The array generation unit 200 outputs the probability distribution array generated as described above. This probability distribution array corresponds to an array obtained by transforming a multidimensional vector. The probability distribution array is generated by differentiable processing such as probability density function, subtraction (calculation of difference), and multiplication (multiplication of element values) as described above. Therefore, the output probability distribution array can be incorporated into a process using a neural network, for example.

Second Embodiment

The second embodiment describes an example of implementing an information processing system as a system that predicts a future position of a moving object by applying an array generated by an array generation unit. The information processing system of the present embodiment is capable of extracting features more properly even with the use of map information generated only from information obtained from sensors such as a camera and a laser sensor, instead of map information prepared in advance.

The moving object is, for example, a vehicle such as an automobile or a motorbike that moves along a lane provided on a road. The moving object is not limited to an automobile or a motorbike, and may be a robot that moves along a lane, for example. The moving object may be an object moving in a lane on the water, such as a ship. The following description will be given mainly using an exemplary case where the moving object is a vehicle.

Figure 5:
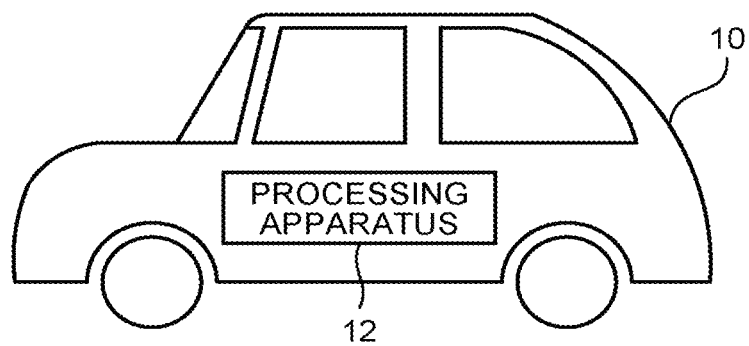
FIG. 5 is a view illustrating a vehicle according to an embodiment.

FIG. 5 is a view illustrating a vehicle 10 according to an embodiment. The vehicle 10 is equipped with a processing apparatus 12. The processing apparatus 12 is a device including a dedicated or general-purpose computer, for example. At least a part of the functions of the processing apparatus 12 may be mounted on another device such as a cloud connected to the vehicle 10 via a network, rather than being mounted on the vehicle 10. The vehicle 10 may be an ordinary vehicle that travels by using driving operations by a person, or an autonomous driving vehicle that can automatically travel (autonomously travel) without using driving operation by a person. The processing apparatus 12 is not limited to the vehicle 10, and may be provided in other devices such as roadside devices.

Figure 6:
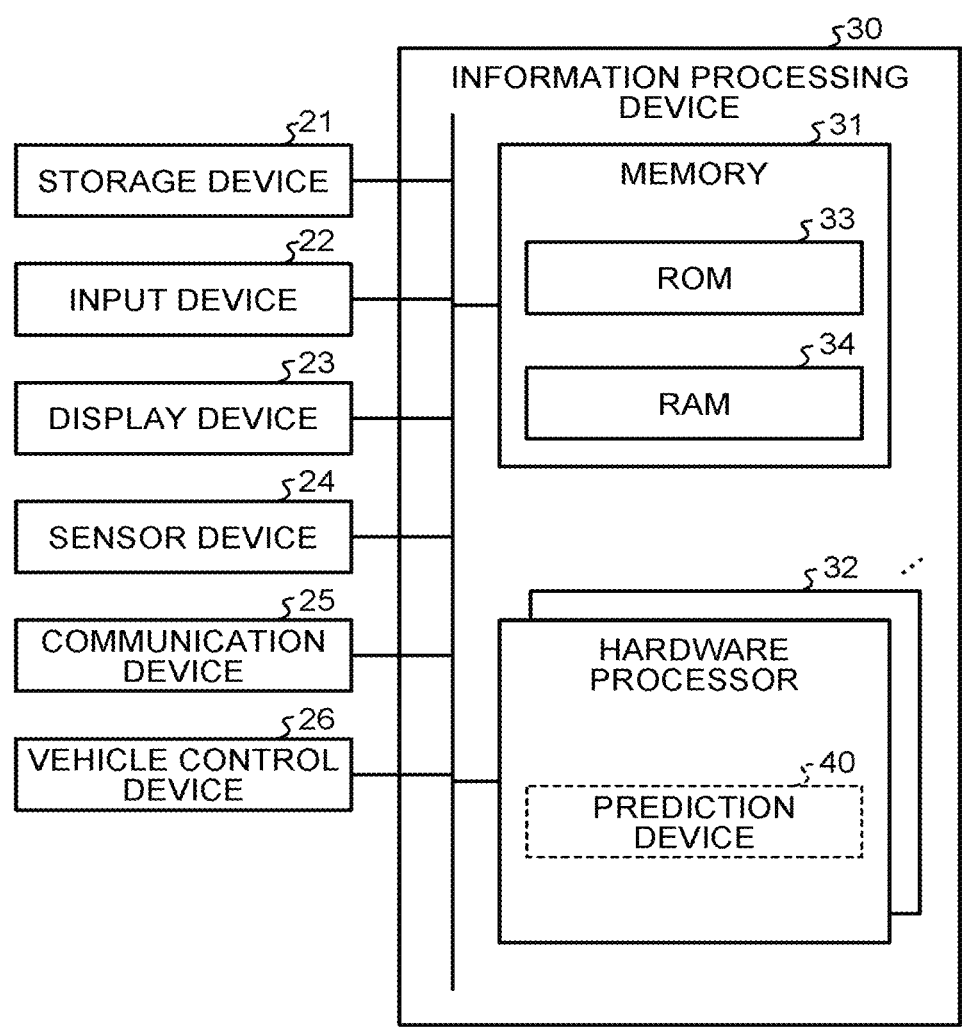
FIG. 6 is a hardware configuration diagram of a processing apparatus.

FIG. 6 is a diagram illustrating an example of a hardware configuration of the processing apparatus 12 according to an embodiment. The processing apparatus 12 includes a storage device 21, an input device 22, a display device 23, a sensor device 24, a communication device 25, a vehicle control device 26, and an information processing device 30.

Examples of the storage device 21 include a hard disk drive, an optical disk drive, or a semiconductor memory element such as a flash drive. The storage device 21 stores a program executed by the processing apparatus 12 and data used by the processing apparatus 12.

The input device 22 receives instructions and information input from the user. Examples of the input device 22 include input devices such as an operation panel, a pointing device such as a mouse or a trackball, or a keyboard.

The display device 23 displays various types of information to the user. The display device 23 is, for example, a display device such as a liquid crystal display device.

The sensor device 24 has one or more sensors that detect surrounding conditions of the vehicle 10. For example, the sensor device 24 detects the position, speed, acceleration, angular velocity, and angular acceleration of a moving object (for example, another vehicle) existing around the vehicle 10. Furthermore, the sensor device 24 detects direction instruction information indicating the traveling direction of a moving object existing around the vehicle 10. For example, the sensor device 24 has a distance sensor (laser sensor, LiDAR, or the like) that detects a distance using laser light. The sensor device 24 may have a millimeter wave sensor that detects the position and speed of the moving object. The sensor device 24 may have a sonar that detects the distance to a surrounding object by sound waves. Furthermore, for example, the sensor device 24 may have a camera that captures an image of a surrounding object. The camera may be of any type of camera, such as a monocular camera and a stereo camera.

The communication device 25 transmits/receives information to/from an external device by wireless communication. The communication device 25 acquires detection result such as the position, speed, acceleration, angular velocity, angular acceleration, and direction instruction information of a moving object existing around the vehicle 10, obtained by a sensor provided in an external device (for example, a roadside device) of the vehicle 10. Furthermore, the communication device 25 may directly communicate with the moving object existing around the vehicle 10, for example, by performing vehicle-to-vehicle communication to acquire the position, speed, acceleration, angular velocity, angular acceleration, and direction instruction information of the moving object.

The vehicle control device 26 controls a drive mechanism for driving the vehicle 10. For example, in a case where the vehicle 10 is an autonomous driving vehicle, surrounding situations are determined based on the position of the moving object predicted by a prediction device 40, the information obtained from the sensor device 24, and other information to control the accelerator amount, braking amount, steering angle, or the like. Furthermore, in the case of an ordinary vehicle in which the vehicle 10 travels by using driving operations by a person, the vehicle control device 26 controls the accelerator amount, the braking amount, the steering angle, or the like based on the operation information.

The information processing device 30 is one or more dedicated or general-purpose, computers, for example. The information processing device 30 manages and controls the storage device 21, the input device 22, the display device 23, the sensor device 24, the communication device 25, and the vehicle control device 26. The information processing device 30 has memory 31 and one or more hardware processors 32.

The memory 31 includes Read Only Memory (ROM) 33 and Random Access Memory (RAM) 34. The ROM 33 non-rewritably stores a program used for controlling the information processing device 30, various setting information, or the like. The RAM 34 is a volatile storage medium such as synchronous dynamic random access memory (SDRAM). The RAM 34 functions as a work area for one or more hardware processors 32.

The one or more hardware processors 32 are connected to the memory 31 (ROM 33 and RAM 34) via a bus. The one or more hardware processors 32 may include, for example, one or more Central Processing Units (CPUs), or may include one or more Graphics Processing Units (GPUs). The one or more hardware processors 32 may include a semiconductor device or the like including a dedicated processing circuit for implementation of a neural network.

By executing various processes in cooperation with various programs preliminarily stored in the ROM 33 or the storage device 21 using a predetermined area of the RAM 34 as a work area, the one or more hardware processors 32 functions as the prediction device 40. The information processing device 30 or the processing apparatus 12 can be considered to correspond to the prediction device 40. Details of the function of the prediction device 40 will be described below.

The program to function as the prediction device 40 may be recorded in a file in an installable or executable format, on a computer readable recording medium such as a Compact Disk Read Only Memory (CD-ROM), a flexible disk (FD), a Compact Disk Recordable (CD-R), or a Digital Versatile Disk (DVD) and may be provided as a computer program product.

Moreover, the program may be stored on a computer connected to a network such as the Internet and provided by being downloaded via the network. Moreover, the program may be provided or distributed via a network such as the Internet.

The vehicle 10, the processing apparatus 12, or the information processing device 30 can be considered to correspond to the information processing system of the second embodiment.

Figure 7:
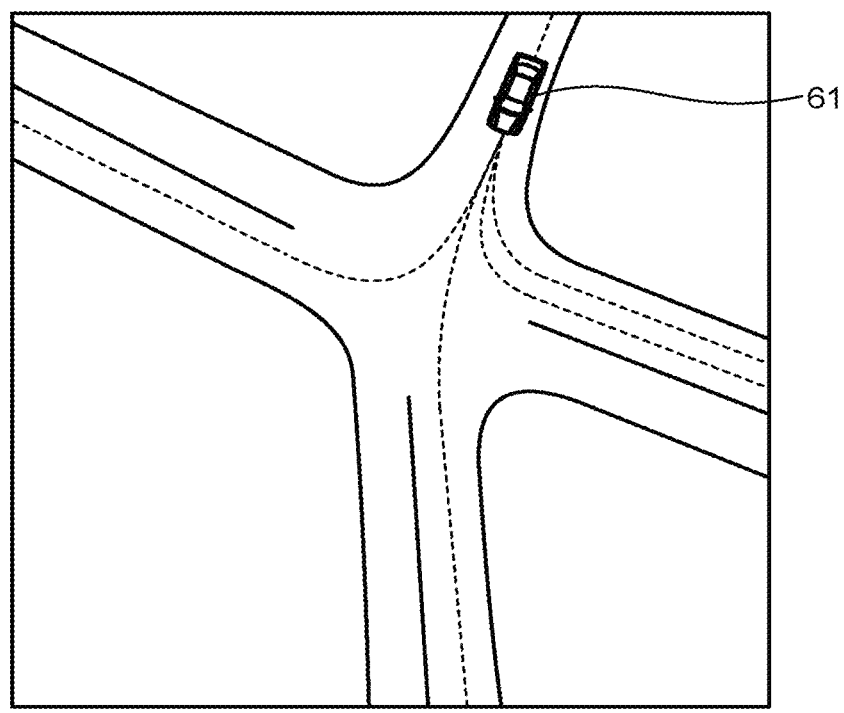
FIG. 7 is a view illustrating an example of predicting a trajectory in accordance with map information prepared in advance.
Figure 8:
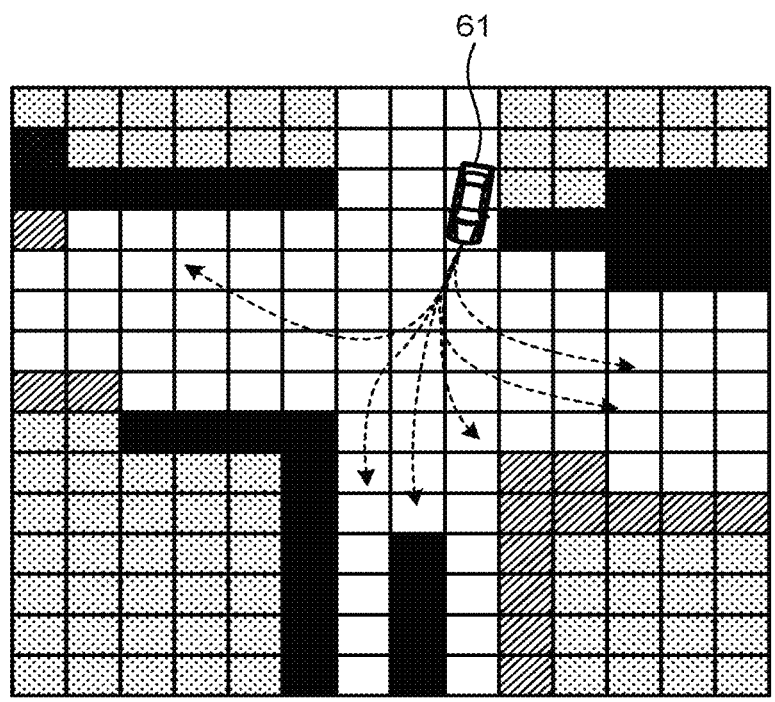
FIG. 8 is a diagram illustrating an example of predicting a trajectory using sensor information alone.

Here, an example of map information will be described. FIG. 7 is a view illustrating an example of predicting the trajectory of a vehicle (an example of a moving object) based on map information prepared in advance including lane information. FIG. 8 is a diagram illustrating an example of predicting the trajectory by using only the information (sensor information) from the sensor device 24 without using the map information prepared in advance. The lane information is information indicating a trajectory on which the moving object can travel. The trajectory is information indicating the positions of moving objects at a plurality of time points.

As illustrated in FIG. 7, a moving object 61 generally moves along a lane (broken line). Therefore, in the trajectory prediction using map information prepared in advance, the action range of the moving object 61 can be narrowed down, even with occurrences of the acceleration/deceleration and the lane selection problems.

An example of map information that can be used when only sensor information is used is an obstacle map illustrating the presence or absence of obstacles in a grid pattern. FIG. 8 illustrates an example of such an obstacle map. For example, a grid with no obstacles is illustrated in white, a grid with obstacles is illustrated in black, and a grid in which the presence of obstacles is unknown is illustrated in gray. In the trajectory prediction using the obstacle map as illustrated in FIG. 8, it is obvious that the moving object 61 moves in areas where there is no obstacle (white area). However, it is difficult to narrow down the area the moving object 61 should pass (arrows) since the range of action can be wide, leading to unstable prediction.

To handle this, in order to extract features more properly and enable prediction of the trajectory with higher precision, the present embodiment uses an array generated by the array generation unit to predict the trajectory of the moving object. Hereinafter, details of the functions of the prediction device 40 of the present embodiment will be described.

Figure 9:
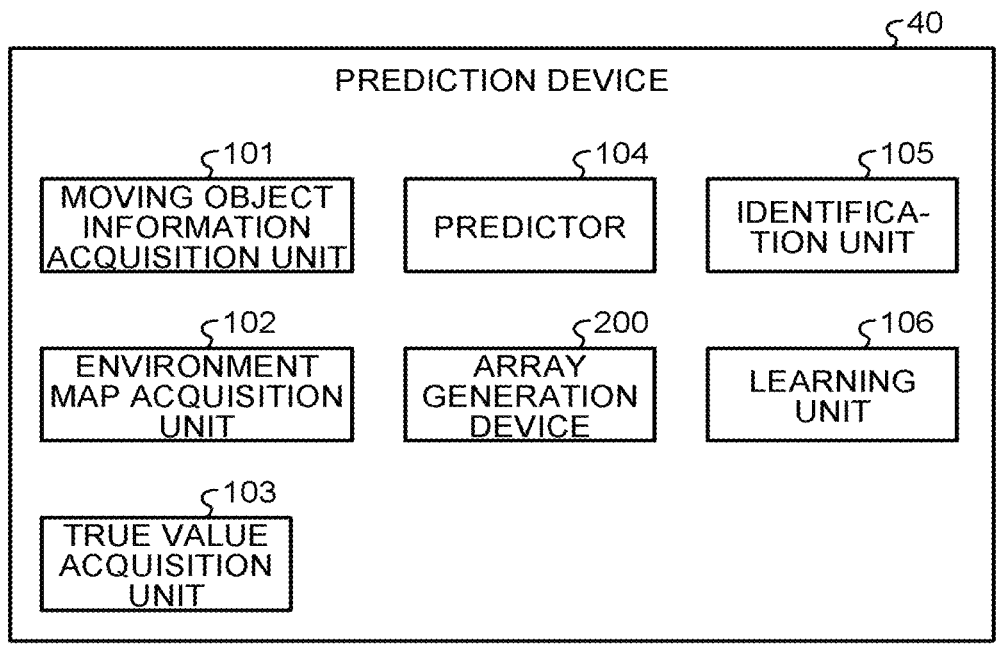
FIG. 9 is a functional block diagram of a prediction device.

FIG. 9 is a block diagram illustrating a functional configuration example of the prediction device 40 according to the present embodiment. As illustrated in FIG. 9, the prediction device 40 includes a moving object information acquisition unit 101, an environment map acquisition unit 102, a true value acquisition unit 103, a predictor 104, an identification unit 105, a learning unit 106, and an array generation unit 200.

The moving object information acquisition unit 101 acquires moving object information indicating the positions of one or more moving objects including a moving object to be predicted (first moving object). For example, the moving object information acquisition unit 101 acquires moving object information by using the sensor device 24, vehicle-to-vehicle communication, road-to-vehicle communication, or the like. Road-to-vehicle communication is communication between an external device such as a roadside device and the vehicle 10. The method of acquiring the moving object information is not limited to this, and any method may be used.

The moving object information may further include at least one of the orientation (angle, etc.), speed, acceleration, angular velocity, angular acceleration, variance of each of these values (direction, velocity, acceleration, angular velocity, and angular acceleration), the direction of movement (direction indicator information or the like), or identification information (such as object ID) of the moving object. For example, the moving object information acquisition unit 101 acquires moving object information for each of time points, and stores the moving object information acquired in time series in the storage device 21 or the like for each of object IDs.

The environment map acquisition unit 102 acquires an environment map (environment map information) including environmental information and moving object information. The environment map acquisition unit 102 acquires environment information, for example, and generates an environment map being map information expressing, on a map, the acquired environmental information and the moving object information acquired by the moving object information acquisition unit 101. For example, the environment map acquisition unit 102 acquires environmental information using only the information obtained from the sensor device 24. The environmental information is information indicating the environment surrounding the moving object to be predicted.

The environment map may be in the form of a bird's-eye view image obtained by converting an image captured by a camera. The environment map may be in the form obtained by transforming the detection result by a distance sensor into an obstacle map. In the case of using a bird's-eye view image, an environment map may be given as a single image representing the entire circumference of a moving object by superimposing a plurality of images captured by a plurality of cameras.

An environment map may include attribute information such as roads, sidewalks, curbs, vehicles, people, and road markings. The attribute information is obtained from the image captured by the camera and point cloud information that is the detection result by the distance sensor by using techniques such as object detection and semantic segmentation.

Each of grids of the environment map is represented by information in a plurality of dimensions. Each of the dimensions indicates either environmental information or attribute information. The attribute information may be expressed in any format. For example, the attribute information may be expressed in a one-hot expression in which only one dimension is 1 and the rest is 0 among a plurality of dimensions. The likelihood of the corresponding attribute obtained by semantic segmentation may be set for each of the plurality of dimensions.

Figure 10:
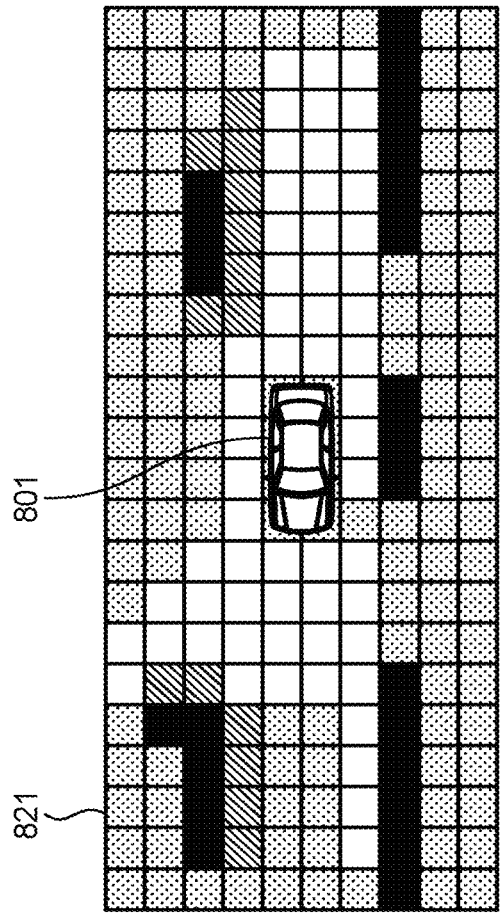
FIG. 10 is a diagram illustrating an example of an environment map.

FIG. 10 is a diagram illustrating an example of an environment map. FIG. 10 illustrates an example of an environment map 821 generated for road conditions as illustrated on the left. In the road condition illustrated in the example of FIG. 10, vehicles 811 and 812 as other moving objects exist around a vehicle 801 corresponding to the vehicle 10.

The environment map 821 is map information illustrating the presence or absence of obstacles when observed from above the vehicle 801 using a plurality of grids. Each of the grids is associated with information that expresses the presence or absence of obstacles with a probability value of 0 to 1. In the environment map 821, a grid with no obstacles is illustrated in white (probability=0), a grid with obstacles is illustrated in black (probability=1), and a grid in which the presence of obstacles is unknown is illustrated in gray having density corresponding to the probability.

For example, when a light beam (laser light, or the like) has been emitted around the vehicle 10, a grid corresponding to the object (moving object or obstacle) at which the light beam has arrived is set to 1 (with an obstacle); while a grid with no object corresponding to the space between the vehicle 10 and the object is set to 0 (no obstacles). In a case where the light beam does not reach any object, a grid through which the light beam passes is set to 0.5 (unknown), for example.

The environment map acquisition unit 102 may generate an environment map so as to include ambiguity in the position where the obstacle exists. For example, the presence or absence of an obstacle may be represented by a probability distribution centered on a grid in which an object exists. Furthermore, the environment map acquisition unit 102 may generate an environment map indicating the presence/absence of only an object excluding the moving object to be predicted.

Returning to FIG. 9, the true value acquisition unit 103 acquires a true value of a future position of the moving object required at the learning applied to a prediction model (neural network or the like) used by the predictor 104 for prediction. The true value includes at least one of position, orientation (angle, etc.), velocity, acceleration, angular velocity, and angular acceleration of the moving object. The true value may be created in any manner. For example, the true value may be created by manual instructions. The moving object information acquired and accumulated by the moving object information acquisition unit 101 may be used for creating the true value. The true values need to be created for each of the time points to be predicted.

The predictor 104 predicts the future position of the moving object from the moving object information and the environment map, and outputs a predicted trajectory of the moving object. The future position may be represented by the coordinates of the position, or may be represented, for example, by the moving amount from the current position.

For example, the predictor 104 predicts one or more positions of the moving object from the environment map and the moving object information acquired at one or more time points. The predictor 104 predicts the position of the moving object by using a prediction model such as a neural network that inputs an environment map and moving object information and outputs a prediction result of the position of the moving object, for example.

The number of moving objects to be predicted is not limited to one, and may be in plurality. The predictor 104 predicts and outputs a trajectory of each of one or more moving objects to be predicted. The predictor 104 may be assigned to each of one or more moving objects, and each of the predictor 104 may predict the trajectory of the corresponding moving object. The moving object to be predicted may be the vehicle 10 itself. For example, the moving object information acquisition unit 101 acquires the moving object information of the vehicle 10 itself by vehicle-to-vehicle communication, road-to-vehicle communication, or the like.

The learning unit 106 provides learning to be applied to the prediction model (neural network) used by the predictor 104. In the case of using a prediction model that has undergone learning in advance, the prediction device 40 does not have to include the learning unit 106. The details of a learning process provided by the learning unit 106 will be described below.

Figure 11:
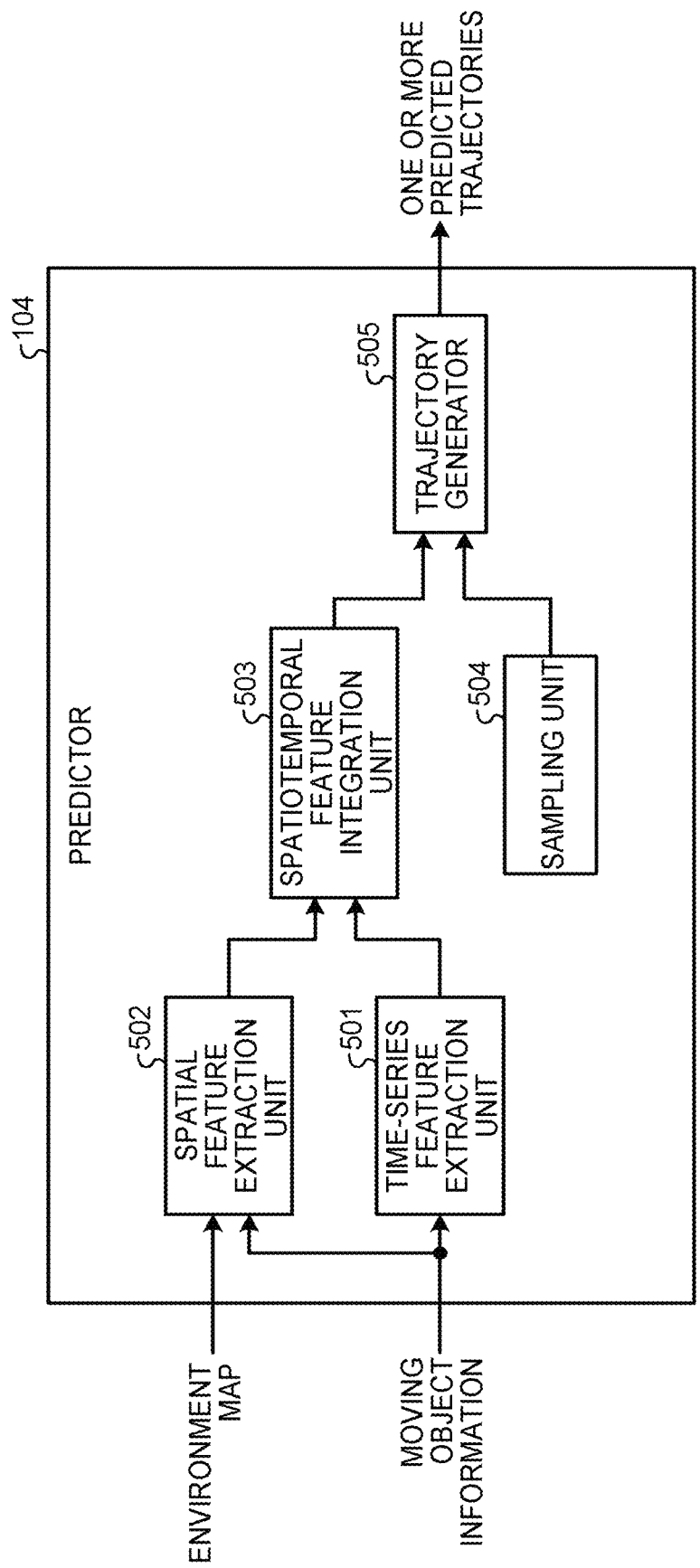
FIG. 11 is a functional block diagram of a predictor.

Next, the details of the function of the predictor 104 will be described. The predictor 104 behaves differently at the time of inference and learning. FIG. 11 is a block diagram illustrating a detailed functional configuration example of the predictor 104 at the time of inference. As illustrated in FIG. 11, the predictor 104 includes a time-series feature extraction unit 501, a spatial feature extraction unit 502, a spatiotemporal feature integration unit 503, a sampling unit 504, and a trajectory generator 505.

The time-series feature extraction unit 501 extracts time-series features from the moving object information and outputs the time-series features. The time-series feature extraction unit 501 inputs data (input data) as a result of acquisition of a one-dimensional vector for one time point or more including at least one of pieces of moving object information acquired by the moving object information acquisition unit 101, such as position, angle, speed, angular velocity, acceleration, and angular acceleration. The time-series features output by the time-series feature extraction unit 501 are information that characterizes a time-series movement change amount of the moving object.

The time-series feature extraction unit 501 includes a recurrent neural network and a fully connected layer, for example, and repeatedly inputs the above input data. Examples of types of usable recurrent neural network include a simple recurrent network (Simple RNN), Long short term memory (LSTM), and a Gated recurrent unit (GRU).

The spatial feature extraction unit 502 inputs the position and angle that are the moving object information acquired by the moving object information acquisition unit 101 and the environment map acquired by the environment map acquisition unit 102 as input data, and then outputs spatial features. Spatial features are information that characterizes the surrounding information of a moving object. For example, the spatial feature extraction unit 502 obtains spatial features for the input data by using a neural network that inputs the input data and outputs the spatial features.

The coordinate system of the environment map is centered on the mounting position of the sensor in the vehicle 10 or in the external device. Therefore, when used as input data for a neural network, the coordinate system needs to be normalized for each of moving objects. That is, the spatial feature extraction unit 502 clips and rotates the environment map using the position and angle of the moving object information at the reference time point (for example, the current time point).

Figure 12:
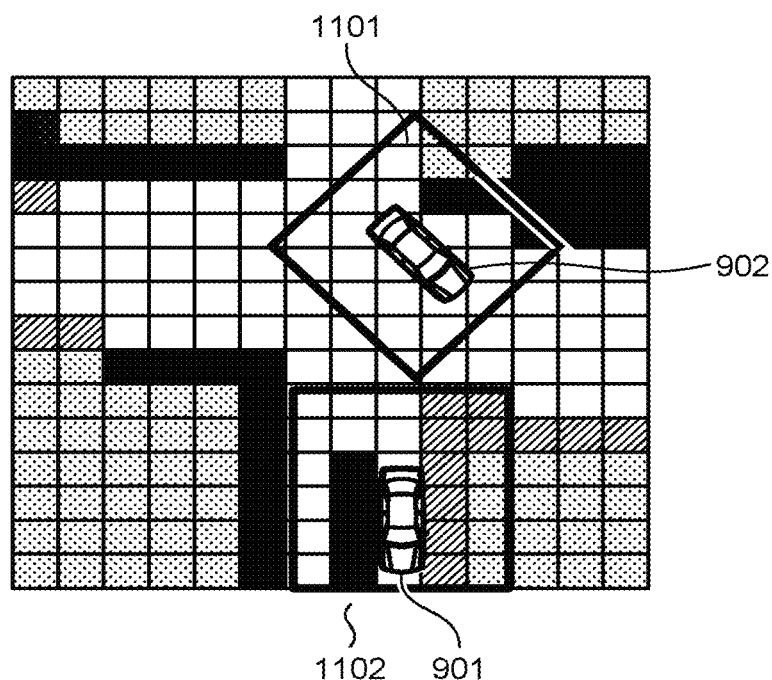
FIG. 12 is a view illustrating an example of normalization of map information.

FIG. 12 is a view illustrating an example of normalization of map information for each of moving objects. In FIG. 12, with the vehicles 901 and 902 as the center, clipping and rotation are performed with rectangles each having a predetermined size so that the traveling direction faces upward. The rectangles 1101 and 1102 are examples of map information normalized to vehicles 902 and 901, respectively.

When an area not included in the map information before normalization comes within a range of the map information after normalization, the spatial feature extraction unit 502 may set a predetermined value or a value estimated from a value of a neighboring area, or the like. Setting is performed by putting "0", "0.5 (unknown in the obstacle map)", or "1", for example.

The above normalization method is an example, and is not limited to this. For example, a method of clipping a rectangle only in the front range of the moving object, a method of not performing the rotation process, or the like may be adopted as the normalization method.

The spatial feature extraction unit 502 inputs the normalized environment map to the neural network. A neural network is constituted with a CNN and a fully connected layer, for example, and outputs spatial features reduced to a one-dimensional vector.

The spatiotemporal feature integration unit 503 inputs the time-series features extracted by the time-series feature extraction unit 501 and the spatial features extracted by the spatial feature extraction unit 502 as input data, and outputs a spatiotemporal feature equivalent to a feature integrating both features. For example, using a neural network that inputs these input data and outputs spatiotemporal features, the spatiotemporal feature integration unit 503 obtains the spatiotemporal feature. Since both the time-series features and the spatial features are one-dimensional vectors, it is possible to use a neural network including a fully connected layer that inputs input data in which these vectors are concatenated in the dimensional direction and outputs the spatiotemporal features.

The sampling unit 504 performs random sampling within a multidimensional normal distribution having one or more dimensions, and generates a sampling value for trajectory prediction. The sampling value is obtained from a latent variable that represents a series of trajectory movements in a multidimensional normal distribution. Latent variables can be considered to be represented by a multidimensional normal distribution that characterizes the trajectory of a moving object. By performing sampling of a plurality of sampling values, it is possible to predict a plurality of trajectories that characterize a future trajectory hypothesis with high likelihood. That is, when the trajectory generator 505 outputs a plurality of trajectories, the sampling unit 504 samples a plurality of sampling values. The multidimensional normal distribution representing the latent variable undergoes learning together with the learning applied to the neural network used in the predictor 104. The details of the learning method of the multidimensional normal distribution will be described below.

The trajectory generator 505 generates a predicted trajectory with an input of the sampled sampling value. The number of times of random samplings performed by the sampling unit 504 (the number of sampling values) is the number of predicted trajectories output by the trajectory generator 505.

By inputting the spatiotemporal features obtained by the spatiotemporal feature integration unit 503 and the sampling values obtained by the sampling unit 504 as input data, the trajectory generator 505 outputs predicted trajectories. The trajectory generator 505 generates a predicted trajectory for each of the sampling values. The trajectory generator 505 may be assigned to each of one or more sampling values, and each of the trajectory generators 505 may perform trajectory prediction for the corresponding sampling value.

For example, the trajectory generator 505 obtains a predicted trajectory using a neural network that inputs the above input data and outputs the predicted trajectory. Since both the spatiotemporal features and sampling values are one-dimensional vectors, it is possible to use a neural network that inputs input data in which these vectors are concatenated in the dimensional direction and outputs the predicted trajectory.

The neural network used by the trajectory generator 505 includes a recurrent neural network and a fully connected layer, for example. The recurrent neural network repeats arithmetic operations at each of time steps until a designated predicted time is reached. The input of the recurrent neural network at each of time steps is the same input data concatenating spatiotemporal features and latent variables. Internal variables in the recurrent neural network are updated sequentially by performing iterative operations.

The output from the fully connected layer of the recurrent neural network at each of time steps is either a coordinate value representing a future position or information representing a distribution of the future position. The coordinate value representing the position is two-dimensional information including an x coordinate value and a y coordinate value, for example. The information representing the distribution of positions is a total of five-dimensional information including two-dimensional coordinate values representing the peaks of positions, two-dimensional values representing variances, and one-dimensional value representing a correlation coefficient.

With iterative operations performed for each of time steps until the designated predicted time is reached, the set of future predicted positions will form one predicted trajectory. The trajectory generator 505 performs such an operation for each of sampling values, and generates predicted trajectories for the number of sampling values.

So far, the functions provided by the predictor 104 have been described separately for individual units (time-series feature extraction unit 501, spatial feature extraction unit 502, spatiotemporal feature integration unit 503, sampling unit 504, trajectory generator 505). Alternatively, some or all of these functions may be integrated. For example, one neural network integrating the neural networks used by individual units may be used as a neural network for trajectory prediction performed by the predictor 104.

Figure 13:
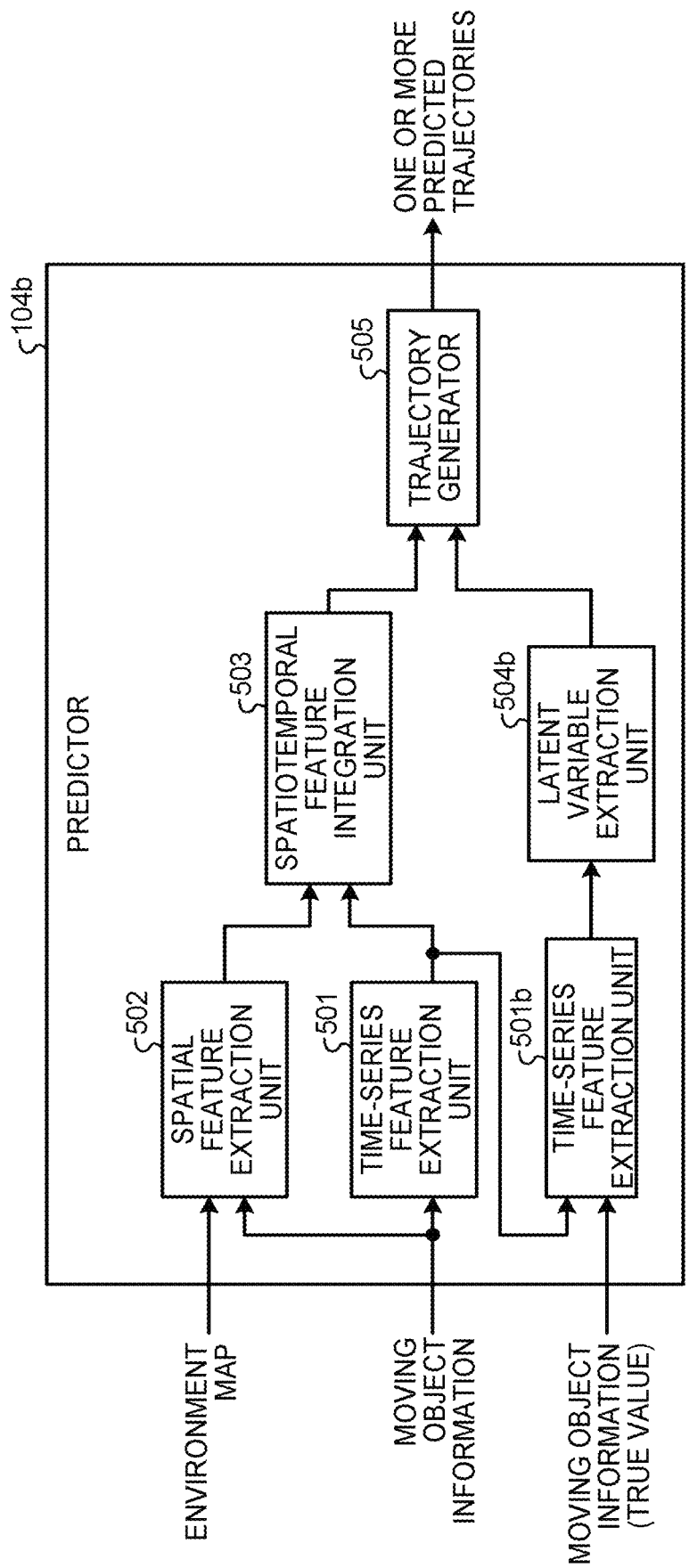
FIG. 13 is a functional block diagram of a predictor.

Next, a learning method to be applied to the neural network used by the predictor 104, provided by the learning unit 106, will be described. FIG. 13 is a block diagram illustrating a detailed functional configuration example of the predictor (hereinafter referred to as a predictor 104b) at the time of learning. As illustrated in FIG. 13, the predictor 104b includes time-series feature extraction units 501 and 501b, a spatial feature extraction unit 502, a spatiotemporal feature integration unit 503, a latent variable extraction unit 504b, and a trajectory generator 505. The same components as those used at the time of inference are indicated by the same reference numerals and description thereof will be omitted.

The time-series feature extraction unit 501b inputs a true value of moving object information (a true value of a trajectory of a moving object), and outputs a time-series feature corresponding to the true value of the moving object information. The true value of the moving object information is data as a result of acquisition, for one time point, of a one-dimensional vector including at least one of the position, angle, speed, angular velocity, acceleration, or angular acceleration of the moving object at a future time point. For example, by performing, after sequentially inputting moving object information to the time-series feature extraction unit 501, inputting the true value to the recurrent neural network of the time-series feature extraction unit 501b having the same parameters (weights, or the like) as the recurrent neural network of the time-series feature extraction unit 501, it is possible to extract time-series features of the trajectory corresponding to the true value. In the following, the trajectory corresponding to the true value will be referred to as a true value trajectory in some cases.

The latent variable extraction unit 504b uses a neural network to extract latent variables whose time-series features of the true value trajectory are close to a multidimensional normal distribution having one or more dimensions. By inputting the time-series features of the true value trajectory into the fully connected layer and outputting them separately for the mean and variance of one dimension or more, the neural network expresses a multidimensional normal distribution. A loss indicating the error between the distribution expressed by the mean and variance and the multidimensional normal distribution will be added to the loss function of the learning. This makes it possible to obtain a multidimensional normal distribution that approximates the time-series features of the true value trajectory. The loss indicating the error between distributions can be represented by a KL Divergence distance, for example.

The latent variable extraction unit 504b uses a Reparameterization trick, for example, to generate a sampling value to be input to the trajectory generator 505. When the mean generated by the latent variable extraction unit 504b is μ and the variance is Σ, the sampling value can be expressed by the following formula (1).

$$\mu = \sqrt{\Sigma} \times N(0, I) \quad (1)$$

where I is the identity matrix. N (0, I) represents random sampling within a multidimensional normal distribution with mean μ=0 and variance Σ=1. With this configuration, sampling from latent variables can be expressed in a backpropagatable format.

The learning unit 106 provides learning so as to minimize the loss function. The loss function includes, in addition to the loss between the above distributions (such as the KL Divergence distance), a loss (loss of the predicted trajectory) indicating the error between the predicted trajectory generated by the trajectory generator 505 and the true value trajectory.

For example, in a case where the output of the trajectory generator 505 is information representing the distribution of positions (such as a two-dimensional normal distribution), the loss of the predicted trajectory is designed so as to maximize (minimize when a negative sign is put) the probability that the position of the true value (true value position) exists within the distribution (two-dimensional normal distribution or the like) represented by the future position, variance, and correlation coefficient output at individual time steps. Furthermore, in a case where the output of the trajectory generator 505 is a coordinate value representing a position, the loss of the predicted trajectory is designed so as to minimize an absolute error or the square error between the output coordinate value and the true value position.

The array generation unit 200 and the identification unit 105 are also used only during the learning. The array generation unit 200 converts the predicted trajectory (predicted vector) generated by the predictor 104 into a probability distribution array (predicted array) having the same size as the environment map. In addition, the true value trajectory (true value vector) acquired by the true value acquisition unit 103 is transformed into a probability distribution array (true value array) having the same size as the environment map.

The identification unit 105 inputs the map information (environment map), the probability distribution array of the predicted trajectory generated by the array generation unit 200, and the probability distribution array of the true value trajectory, as input data, and outputs the probability indicating as to whether the value is a true value or a predicted value. The input probability distribution array is given for each of time points for both the true value trajectory and the predicted trajectory. For example, the identification unit 105 outputs the probability by using an identification model such as a neural network for which the above input data is input and the probability is output. The probability indicating whether the value is a true value or a predicted value can be considered as information indicating whether the input trajectory (predicted trajectory or true value trajectory) is correct.

Figure 14:
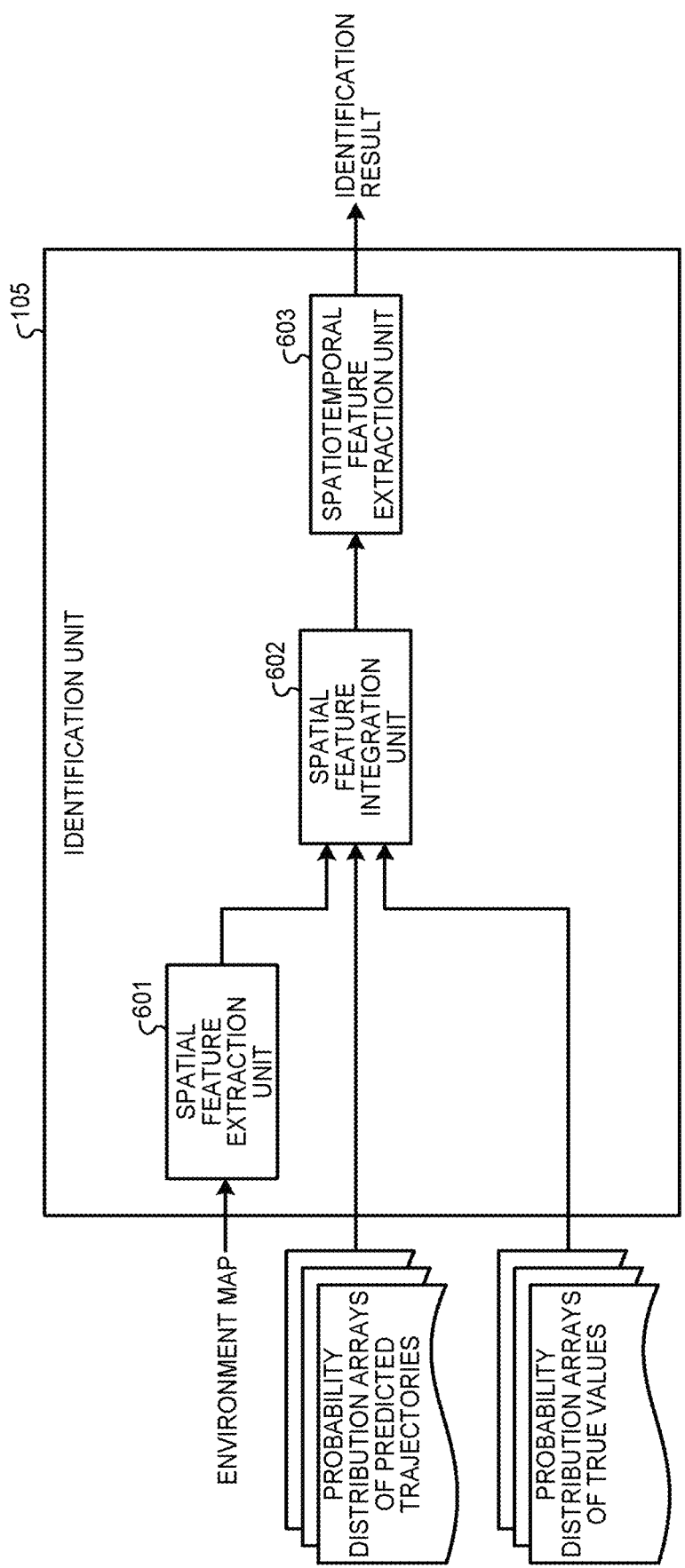
FIG. 14 is a block diagram of an identification unit.

FIG. 14 is a block diagram illustrating a configuration example of the identification unit 105. As illustrated in FIG. 14, the identification unit 105 includes a spatial feature extraction unit 601, a spatial feature integration unit 602, and a spatiotemporal feature extraction unit 603.

The spatial feature extraction unit 601 inputs an environment map as input data and outputs spatial features. Spatial features are information that characterizes the surrounding information of a moving object. For example, the spatial feature extraction unit 601 obtains spatial features for the input data by using a neural network that inputs the input data and outputs the spatial features. This neural network has parameters different from the parameters of the neural network used by the spatial feature extraction unit 502 included in the predictor 104.

The spatial feature integration unit 602 inputs the spatial features extracted by the spatial feature extraction unit 601 and the probability distribution array (true value trajectory or predicted trajectory), and concatenates them in a channel direction. Since the size of the spatial feature (the size of each of coordinates represented in two dimensions) and the size of the probability distribution array are the same, they can be concatenated. By concatenating with a probability distribution array, it is possible to add the predicted value of the position (predicted trajectory) and the true value of the position (true value trajectory) in a differentiable state without impairing the space of the spatial feature.

Since the probability distribution array exists for each of time points, the spatial feature integration unit 602 concatenates the spatial feature and the probability distribution array at each of the time points. The spatial feature integration unit 602 uses the same environment map at each of time points. This leads to generation of three-dimensional spatial features for the number of time points.

The spatiotemporal feature extraction unit 603 outputs a probability indicating whether the input spatial feature is a predicted value or a true value based on the spatial features for the number of time points. For example, the spatiotemporal feature extraction unit 603 is constituted with a Convolutional LSTM combining convolution and Long short term memory (LSTM), and recursively inputs spatial features.

The spatiotemporal feature extraction unit 603 outputs, for example, a probability indicating whether it is a true value or a predicted value by using Convolutional Neural Networks (CNNs) having the same parameter for each of time points, a fully connected layer, and a sigmoid function. The spatiotemporal feature extraction unit 603 may output a probability indicating the true value or the predicted value by using the CNN, the fully connected layer, and the sigmoid function based only on the output of the last time point of the Convolutional LSTM. The spatiotemporal feature extraction unit 603 operates individually for the true value trajectory and the predicted trajectory, using a neural network having the same parameters.

The identification unit 105 plays the role of a discriminator of a Generative Adversarial Network (GAN) in deep learning. In the present embodiment, with application of a GAN framework, the identification unit 105 and the predictor 104 undergo learning.

That is, at the time of learning applied to the entire network (described below), the learning unit 106 alternately applies learning to the predictor 104 (Generator in GAN) and the identification unit 105. At the time of learning provided for the predictor 104, the learning unit 106 fixes the network parameters of the identification unit 105 and applies learning so as to achieve a high probability of identifying the predicted trajectory as a true value. At the time of learning provided for the identification unit 105, the learning unit 106 fixes the network parameters of the predictor 104, and applies learning so as to decrease the probability of identifying the predicted trajectory output by the identification unit 105 as a true value and so as to increase the probability of identifying the true value trajectory as a true value.

In the GAN, alternately applying learning to the Discriminator and the Generator would improve the accuracy of the Generator. The present embodiment aims to improve the accuracy of the trajectory prediction by the predictor 104 by applying the GAN using the identification unit 105 as the Discriminator and the predictor 104 as the Generator.

The use of the GAN framework makes it possible to extract more effective features even in a case of predicting the trajectory with an environment map that does not include information such as the lane center line without using the map information prepared in advance, for example. Furthermore, the use of the array generation unit 200 makes it possible to make the trajectory information represented by the vector compatible with the map information represented by images. As a result, it is possible to retain the information without impairing its spatial characteristics.

The learning applied to the entire network provided by the learning unit 106 will be described. The learning unit 106 optimizes the KL Divergence distance for bringing the multidimensional distribution obtained by the latent variable extraction unit 504b closer to the multidimensional normal distribution, the error between the predicted trajectory obtained by the trajectory generator 505 and the true value trajectory, and the probability output by the identification unit 105.

As described above, the learning unit 106 alternately applies learning to the predictor 104 (prediction model) and the identification unit 105 (identification model). Let p be the probability of output when the predicted trajectory is input to the identification unit 105, and p* be the probability of output when the true value trajectory is input to the identification unit 105.

At the time of learning applied to the predictor 104, the learning unit 106 fixes the network parameters of the identification unit 105. At this time, the loss function combines three methods: the KL Divergence distance, the error between the predicted trajectory obtained by the trajectory generator 505 and the true value trajectory, and the loss for increasing the probability of identifying the predicted trajectory as the true value. The loss for increasing the probability of identifying the predicted trajectory as a true value is expressed by $-\log(p)$, for example.

Meanwhile, at the time of learning applied to the identification unit 105, the learning unit 106 fixes the network parameters of the predictor 104. The learning unit 106 provides learning so as to decrease the probability that the identification unit 105 identifies the predicted trajectory as a true value and so as to increase the probability that the true value trajectory is identified as a true value. At this time, the loss function is expressed by $\{-\log(1-p)\}-\log(p^*)$.

With the above configuration, it is possible to actualize a system that predicts the future position of the moving object with application of the array generation unit 200.

Figure 15:
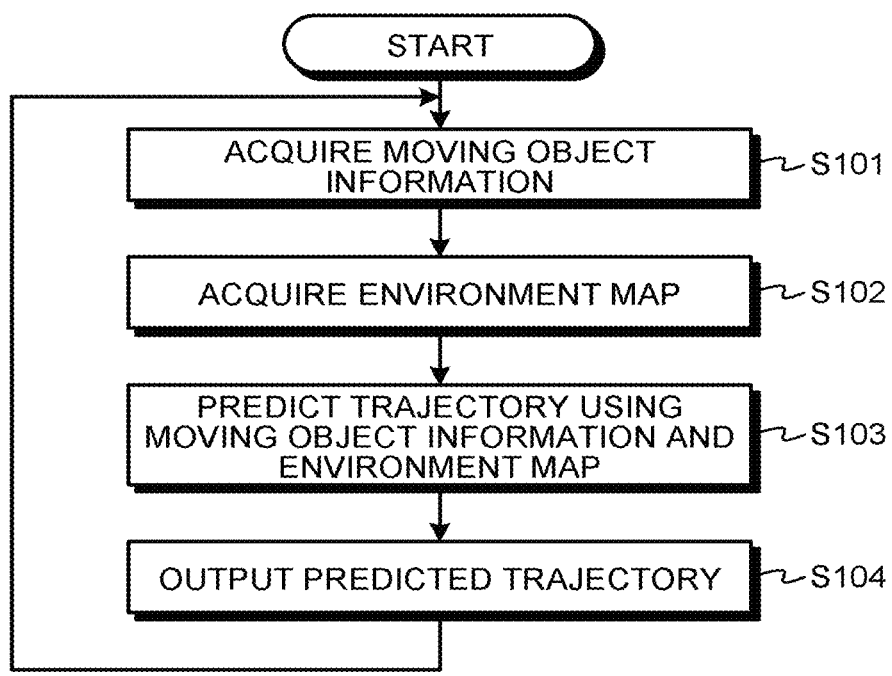
FIG. 15 is a flowchart of a prediction process.

Next, a flow of the prediction process performed by the prediction device 40 according to the present embodiment configured in this manner will be described. FIG. 15 is a flowchart illustrating an example of the prediction process according to the present embodiment.

The moving object information acquisition unit 101 acquires moving object information from the sensor device 24 or the like (Step S101). The environment map acquisition unit 102 acquires an environment map (Step S102). The predictor 104 predicts the trajectory of the moving object by using moving object information and the environment map (Step S103). The predictor 104 outputs the predicted trajectory obtained by the prediction (Step S104). Thereafter, the process returns to Step S101 and the process will be repeated.

Figure 16:
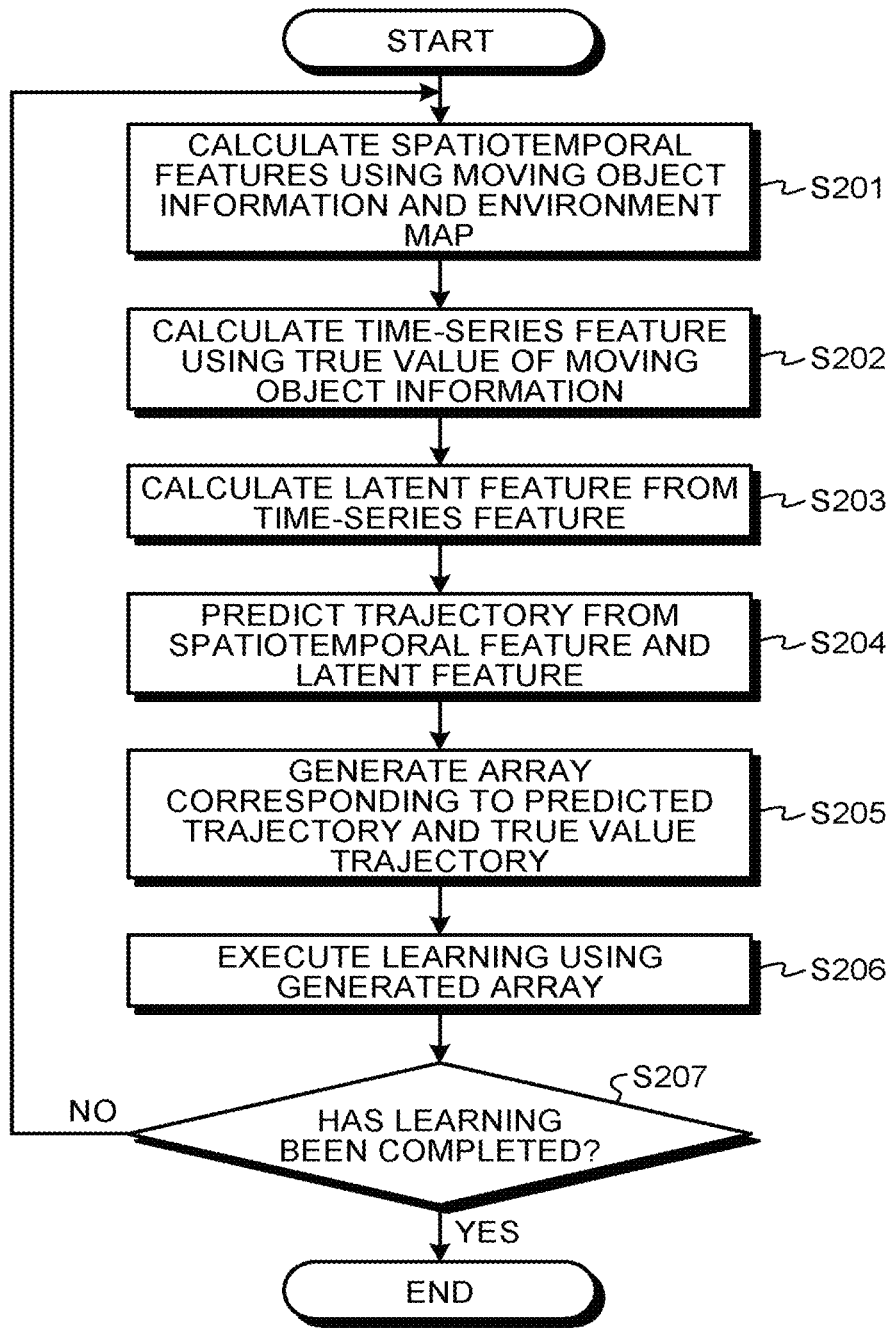
FIG. 16 is a flowchart of a learning process.

Next, a flow of the learning process performed by the prediction device 40 according to the present embodiment configured in this manner will be described. FIG. 16 is a flowchart illustrating an example of the learning process in the present embodiment.

The predictor 104b (time-series feature extraction unit 501, spatial feature extraction unit 502, and spatiotemporal feature integration unit 503) used in the learning calculates spatiotemporal features using moving object information and an environment map (Step S201). Furthermore, the predictor 104b (time-series feature extraction unit 501b) calculates the time-series feature using the true value of the moving object information (Step S202).

The predictor 104b (latent variable extraction unit 504b) calculates a latent feature from the time-series feature calculated in Step S202 (Step S203). The predictor 104b predicts a trajectory from the spatiotemporal feature calculated in Step S201 and the latent feature calculated in Step S203 (Step S204).

The array generation unit 200 inputs the predicted trajectory and the true value trajectory, and generates a probability distribution array for each of trajectories (Step S205).

The learning unit 106 executes a learning process so as to minimize the loss function including a loss indicating an error between the predicted trajectory and the true value trajectory, a loss indicating an error between distributions, and a loss for increasing the probability of identifying the predicted trajectory as a true value (Step S206). The learning unit 106 determines whether the learning is completed (Step S207). For example, the learning unit 106 determines the end of learning based on whether the magnitude of the improvement in loss is smaller than a threshold and whether the number of times of learning has reached an upper limit value.

In a case where the learning is not completed (Step S207: No), the process returns to Step S201 and the process is repeated for new training data. When it is determined that the learning is completed (Step S207: Yes), the learning process ends.

Modification

Figure 17:
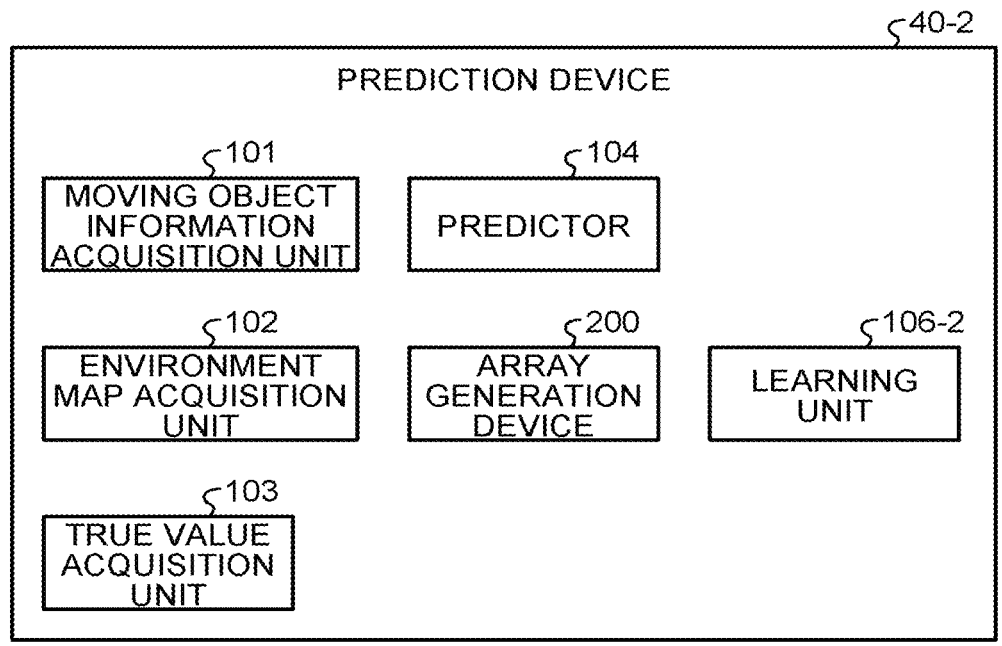
FIG. 17 is a functional block diagram of a prediction device according to a modification.

FIG. 17 is a block diagram illustrating a functional configuration example of a prediction device 40-2 according to a modification. As illustrated in FIG. 17, the prediction device 40-2 includes a moving object information acquisition unit 101, an environment map acquisition unit 102, a true value acquisition unit 103, a predictor 104, a learning unit 106-2, and an array generation unit 200.

The present modification is different from the prediction device 40 of the second embodiment in that the identification unit 105 is not provided and the learning unit 106-2 has different functions. Since the other configurations are the same as those in FIG. 9, which illustrates the configuration of the prediction device 40 of the second embodiment, the same reference numerals are given and the description thereof will be omitted.

In the present modification, the array generation unit 200 generates a probability distribution array only for the predicted trajectory.

An identification unit 105-2 is not provided in the present modification, and therefore, the learning unit 106-2 provides learning using the loss adapted for optimizing the probability distribution array instead of the loss for increasing the probability of identifying the predicted trajectory as a true value. The loss to be used for optimizing the probability distribution array can be defined by using, for example, an absolute error or the square error for each of elements between the image obtained by projecting the true value trajectory on the environment map and the probability distribution array. The flow of the learning process provided by the learning unit 106-2 is the similar to the flow of FIG. 16.

As described above, the information processing system of the embodiment converts vector information (position information, trajectory, or the like) into an array format that can be projected onto a map (image). Since the transformation includes differentiable processes, it can be easily incorporated into a neural network used in other processes such as trajectory prediction.

Even when using map information (environment map, or the like) generated using only sensors without using map information prepared in advance, it is possible to extract features more effectively by projecting a vector representing the position of the moving object onto the map information, As a result, the trajectory of the moving object can be predicted with higher robustness even when there is no map information, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vehicle control system adapted to control a vehicle, the vehicle control system comprising:
a prediction device that predicts a position of a first moving object; and
a vehicle control device that controls a drive mechanism for driving the vehicle based on the predicted position, wherein
the prediction device comprises:
one or more hardware processors configured to:
use a prediction model for which moving object information indicating positions of one or more moving objects including the first moving object is input and environment map information expressing, on a map, an environment around the first moving object is input and predict the position of the first moving object;
acquire an n-dimensional vector representing the position predicted by the predictor, n being an integer of 2 or more;
generate n coordinate arrays, each coordinate array forming an n-dimensional array, with respect to each of elements of an m-th array of the n coordinate arrays, m being equal to or greater than 1 and equal to or smaller than n and corresponding to one of the n dimensions, an element value is set to have a same value as an index of an m-th dimensional coordinate of the elements in a direction corresponding to an m-th dimension of the n dimensions;
obtain n first probability distribution arrays being an output value of a probability density function applied to each of the element values of the n coordinate arrays, multiply the n first probability distribution arrays to obtain a second probability distribution array; and
use the second probability distribution array to apply learning on the prediction model,
wherein
the output value is
obtained by inputting an input value obtained from the vector and the element value of a coordinate array into the probability density function.

2. The vehicle control system according to claim 1, wherein
the one or more hardware processors, for each of the n coordinate arrays, calculate a difference between a dimension value of the vector and each of the element values of the coordinate array, input the difference to the probability density function as the input value, and obtain the first probability distribution array.

3. The vehicle control system according to claim 2, wherein the probability density function is a function that maximizes the output value when the input value is 0.

4. The vehicle control system according to claim 1, wherein a variance of the probability density function is a fixed value or a value obtained by learning.

5. The vehicle control system according to claim 1, wherein the one or more hardware processors are configured to:
acquire a predicted vector representing the predicted position,
obtain a predicted array that is the second probability distribution array when the predicted vector is defined as the vector, and
use the predicted array to apply learning on the prediction model.

6. The vehicle control system according to claim 5, wherein
the one or more hardware processors obtain the predicted array, which is the second probability distribution array when the predicted vector is defined as the vector, and obtain a true value array, which is the second probability distribution array when a true value vector representing a true value of the position of the first moving object is defined as the vector,
identify whether the predicted array or the true value array is correct by using an identification model for which the predicted array or the true value array is input, and
provide learning on the identification model.

7. The vehicle control system according to claim 6, wherein the one or more hardware processors input concatenated map information in which the predicted array or the true value array is concatenated with the environment map information to the identification model, and identify whether the predicted array or the true value array is correct.

8. The vehicle control system according to claim 6, wherein the one or more hardware processors alternately apply learning on the prediction model and the identification model.

9. The vehicle control system according to claim 5, wherein the environment map information is generated based on environmental information indicating an environment around the first moving object and the moving object information.

10. The vehicle control system according to claim 5, wherein the one or more hardware processors predict the position of the first moving object by using the prediction model, which is a neural network having the environment map information and the moving object information as an input.

11. The vehicle control system according to claim 10, wherein the neural network predicts one or more positions for each of one or more variables sampled based on a multidimensional normal distribution that characterizes a trajectory of the first moving object.

12. A method, implemented by one or more hardware processors of a vehicle control system adapted to control a vehicle, the vehicle control system including a prediction device that predicts a position of a first moving object, and a vehicle control device that controls a drive mechanism for driving the vehicle based on the predicted position, the method comprising:
using a prediction model for which moving object information indicating positions of one or more moving objects including the first moving object is input and environment map information expressing, on a map, an environment around the first moving object is input and predict the position of the first moving object;
acquiring an n-dimensional vector representing the position predicted by the predictor, n being an integer of 2 or more;
generating n coordinate arrays, each coordinate array forming an n-dimensional array, with respect to each of elements of an m-th array of the n coordinate arrays, m being equal to or greater than 1 and equal to or smaller than n and corresponding to one of the n dimensions, an element value is set to have a same value as an index of an m-th dimensional coordinate of the elements in a direction corresponding to an m-th dimension of the n dimensions;

obtaining n first probability distribution arrays being an output value of a probability density function applied to each of the element values of the n coordinate arrays, multiply the n first probability distribution arrays to obtain a second probability distribution array; and using the second probability distribution array to apply learning on the prediction model, wherein the output value is obtained by inputting an input value obtained from the vector and the element value of a coordinate array into the probability density function.

* * * * *